(12) United States Patent
Uhl

(10) Patent No.: US 8,434,608 B2
(45) Date of Patent: May 7, 2013

(54) CENTRIFUGAL CLUTCH

(75) Inventor: Klaus-Martin Uhl, Plochingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 1081 days.

(21) Appl. No.: 12/068,769

(22) Filed: Feb. 12, 2008

(65) Prior Publication Data

US 2009/0008208 A1 Jan. 8, 2009

(30) Foreign Application Priority Data

Jul. 5, 2007 (DE) .......................... 10 2007 031 338

(51) Int. Cl.
*F16D 43/18* (2006.01)
(52) U.S. Cl.
USPC ..................................... 192/105 BA; 192/76
(58) Field of Classification Search ............. 192/105 BA
See application file for complete search history.

(56) References Cited

U.S. PATENT DOCUMENTS

| | | | | |
|---|---|---|---|---|
| 1,823,074 A | * | 9/1931 | Wersall ................... | 192/105 BA |
| 1,851,146 A | * | 3/1932 | Banker .................. | 192/105 BA |
| 2,429,697 A | * | 10/1947 | Rawson ................. | 192/105 BA |
| 2,754,948 A | * | 7/1956 | Pohl ...................... | 192/105 BA |
| 3,610,382 A | * | 10/1971 | Makinson ....................... | 192/95 |
| 4,625,849 A | | 12/1986 | Gommel | |
| 4,819,779 A | * | 4/1989 | Nickel et al. .......... | 192/105 BA |
| 5,419,421 A | * | 5/1995 | Lohr ..................... | 192/105 BA |
| 5,921,364 A | * | 7/1999 | Kobayashi ............. | 192/105 BA |
| 6,247,570 B1 | * | 6/2001 | Zindler .................. | 192/105 BA |

* cited by examiner

*Primary Examiner* — David D Le
*Assistant Examiner* — Ryan Dodd
(74) *Attorney, Agent, or Firm* — Walter Ottesen

(57) ABSTRACT

A centrifugal clutch (1) has a clutch drum (2) and at least one centrifugal weight (6). The centrifugal weight (6) is arranged on a carrier (5) and is radially displaceable referred to the rotational axis (8) of the centrifugal clutch (1). At least one holder (7, 27) holds the centrifugal weight (6) in at least one axial direction of the rotational axis (8) on the carrier (5). The holder (7, 27) includes at least one guide surface (14, 34) with which the holder is guided in radial direction to the rotational axis (8). The guide surface (14, 34) extends parallelly and radially to the rotational axis (8) of the centrifugal clutch (1). The guide surface (14, 34) is configured in a planar region of the holder (7, 27) in order to obtain a long service life of the centrifugal clutch (1).

15 Claims, 3 Drawing Sheets

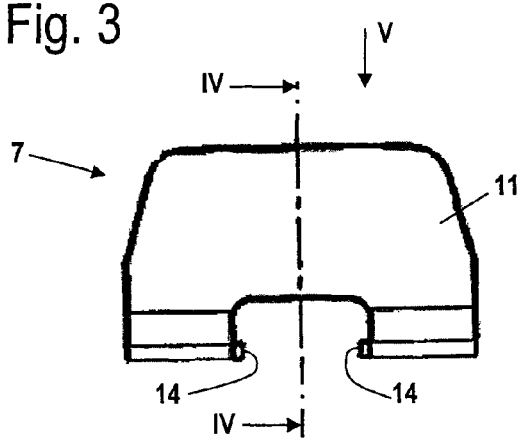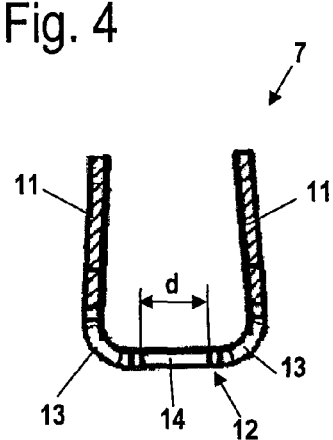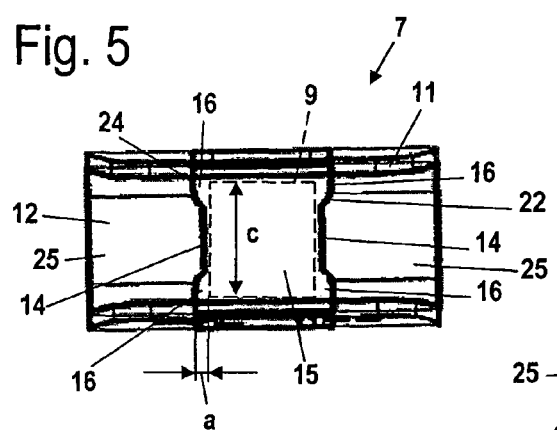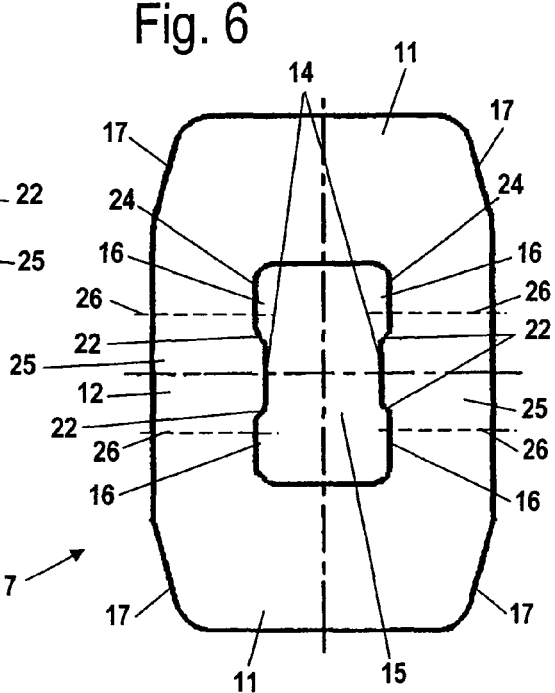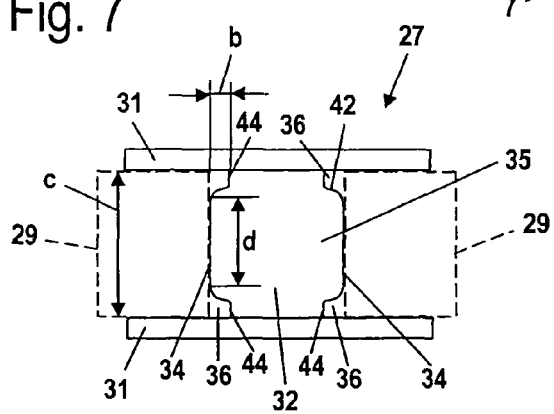

CENTRIFUGAL CLUTCH

CROSS REFERENCE TO RELATED APPLICATION

This application claims priority of German patent application no. 10 2007 031 338.3, filed Jul. 5, 2007, the entire content of which is incorporated herein by reference.

BACKGROUND OF THE INVENTION

A centrifugal clutch is known, for example, from U.S. Pat. No. 4,625,849. Centrifugal clutches of this kind especially connect drive motor and tool in handheld work apparatus and especially portable work apparatus such as motor-driven chain saws, brushcutters, cutoff machines or the like.

It has been shown that wear can occur at the holders during operation of the centrifugal clutch with these holders axially securing the centrifugal weights in the axial direction.

SUMMARY OF THE INVENTION

It is an object of the invention to provide a centrifugal clutch of the kind described above which exhibits low wear and has a long service life.

The centrifugal clutch of the invention includes: a carrier defining an axis of rotation; a clutch drum disposed in surrounding relationship to the carrier; at least one centrifugal weight disposed within the clutch drum; the centrifugal weight being mounted on the carrier so as to be radially displaceable relative to the axis; at least one holder for holding the centrifugal weight on the carrier in at least one axial direction of the axis; the holder having at least one guide surface for guiding the holder in a radial direction relative to the axis; the guide surface extending parallel to the axis and parallel to the radial direction relative to the axis; and, the holder having a planar region and the guide surface being formed in the planar region.

Known holders for centrifugal weights are configured as sheet-metal bent parts. The guide surfaces for guiding the holder on the carrier are formed on the end faces of the holder. These end faces extend into the bent region of the holder. It has been shown that especially in the bent region of the holder, the wear on the guide surfaces is increased. In the bent region, the holder can be subjected to additional load because of the pretensioning of the holder. When the guide surfaces extend only in the planar region, the load of the holder in the bent region can be reduced so that an overload of the holder is avoided especially in the bent region. Because the guide surface is configured only in a planar region of the holder, the wear, which arises during operation, can be greatly reduced. The service life of the centrifugal clutch is significantly increased. Delimiting the guide surface to the planar region can be realized in a simple manner by slight changes of the configuration of the holder.

In order to achieve a clear delimitation of the guide surface, the holder has a step next to a guide surface and this step defines a delimiting of the guide surface. It is advantageous to arrange the holder on an arm. The width of the guide surface in the direction of the rotational axis of the centrifugal clutch is less than the width of the arm in this direction. In this way, the width of the guide surface is less than the width of the arms so that the guide surface can be limited to a planar region of the holder. The arm is especially an arm of the carrier or an arm of the centrifugal weight on which the holder is guided.

The holder advantageously has at least one leg which is transverse, especially approximately perpendicular, to the rotational axis and this leg secures the centrifugal weight in the axial direction of the rotational axis relative to the carrier. It can be provided that the centrifugal weight is secured relative to the carrier only in one axial direction. It can, however, also be provided that the holder secures the centrifugal weight in both axial directions relative to the carrier. In this way, a simple configuration of the centrifugal clutch results.

Two legs are advantageously provided on opposite-lying end faces of the carrier. The legs lie especially tightly against the end faces of the carrier so that a small structural size and a secure holding of the centrifugal weight in axial direction on the carrier results. Play between the carrier and the centrifugal weight can be minimized in this manner. The legs are configured as resilient clamping legs in order to achieve a balancing of tolerances and a good axial hold. Especially when configuring at least one leg as a resilient clamping leg, the configuration of the guide surface only in the planar region is advantageous because the load on the holder can thereby be reduced in the bent region.

The holder has a guide region which lies parallel to the rotational axis of the centrifugal clutch and is configured on the at least one guide surface. The holder is especially configured to have a U-shape. The guide region then forms the base of the U-shape. The legs of the holder are advantageously the legs of the U. However, a Z-shape of the holder can also be provided wherein one leg projects radially outwardly and the other leg projects radially inwardly.

A bend region is advantageously formed between the guide region and the leg and the guide surface terminates ahead of the bend region. In the bend region, the holder is configured so as to be bent. It has been shown that with the configuration of the holder as a bendable part, deformations of the material occur in the bend region which lead to unevenness of the end face of the holder in this region. In that the guide surface ends ahead of the bend region, it is ensured that this uneven region does not contribute to the guidance. This reduces wear during operation. To ensure that the bend region does not contribute to the guidance and cannot come in contact against the arm during operation, the holder has a cutout in the bend region with the base of the cutout being at a distance to the guide surface. Accordingly, it is ensured in a simple manner that only the planar region of the holder, which forms the guide surface, comes into contact with the arm of the carrier. The distance is measured perpendicular to the plane of the guide surface. A contact of the bend region of the holder with the arm of the carrier is avoided so that even a mechanical weakening of the holder in the bend region because of wear is avoided. This wear could lead to a notch on the holder for example.

A good guidance is achieved when the guide region has two struts having respectively at least one guide surface. The struts conjointly delimit an opening through which one arm of the carrier projects. It can, however, also be provided that the guide region has one strut which lies between two arms of the carrier and guide surfaces are formed on the opposite-lying sides thereof. With both configurations, a guidance of the centrifugal weights in radial direction is achieved in a simple manner as is a simultaneous securing of the position of the holder in the axial direction.

Advantageously, the holder is a sheet-metal bent part. As a sheet-metal bent part, the holder can be manufactured in a simple manner. Delimiting the guide surfaces, for example, by cutouts or the like can be produced with the holder in one work step so that the holder is easy to manufacture. Especially several centrifugal weights are provided. A holder is provided for each centrifugal weight and all holders are configured identically.

BRIEF DESCRIPTION OF THE DRAWINGS

The invention will now be described with reference to the drawings wherein:

FIG. 3 is a side elevation view of a holder of the centrifugal clutch of FIGS. 1 and 2;

FIG. 4 is a section view taken along line IV-IV of FIG. 3;

FIG. 5 is a plan view of the holder of FIG. 3 viewed in the direction of arrow V in FIG. 3;

FIG. 6 is a sheet-metal section from which the holder of FIGS. 3 to 5 can be bent;

FIG. 7 is a plan view of an embodiment of a holder;

DESCRIPTION OF THE PREFERRED EMBODIMENTS OF THE INVENTION

Figure 1:
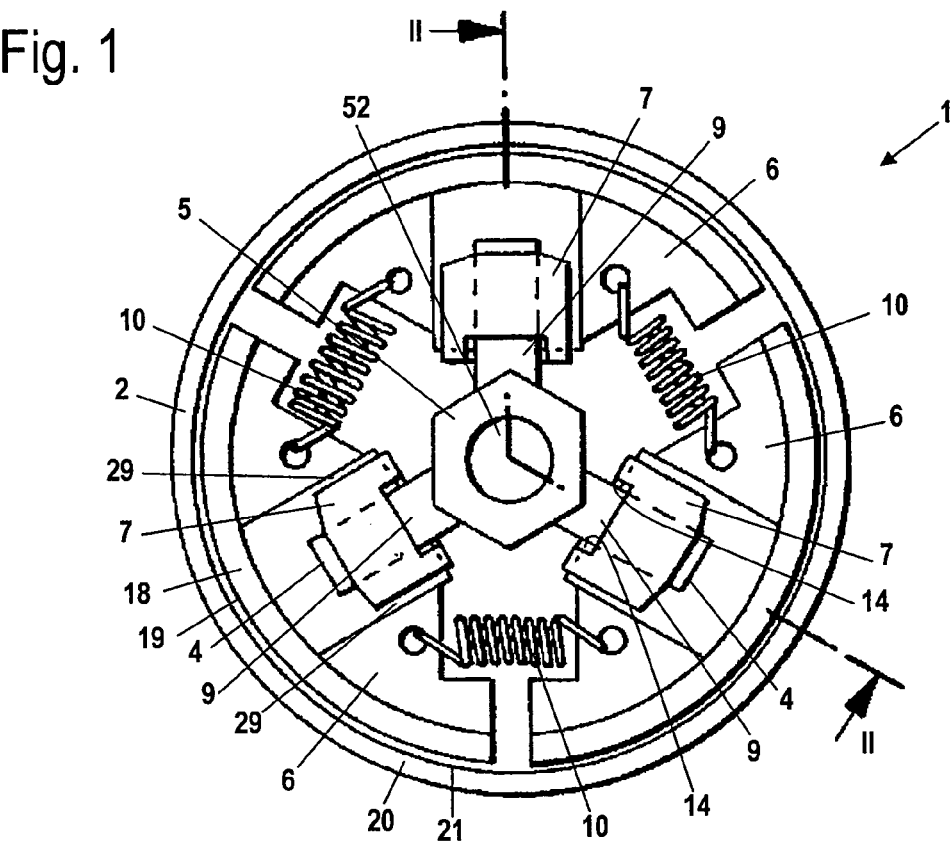
FIG. 1 is a side elevation view of a centrifugal clutch.

The centrifugal clutch 1 shown in FIG. 1 connects a drive motor to a work tool. The drive motor is especially the drive motor in a portable handheld work apparatus such as a motor-driven chain saw, a cutoff machine, a brushcutter or the like.

Figure 8:
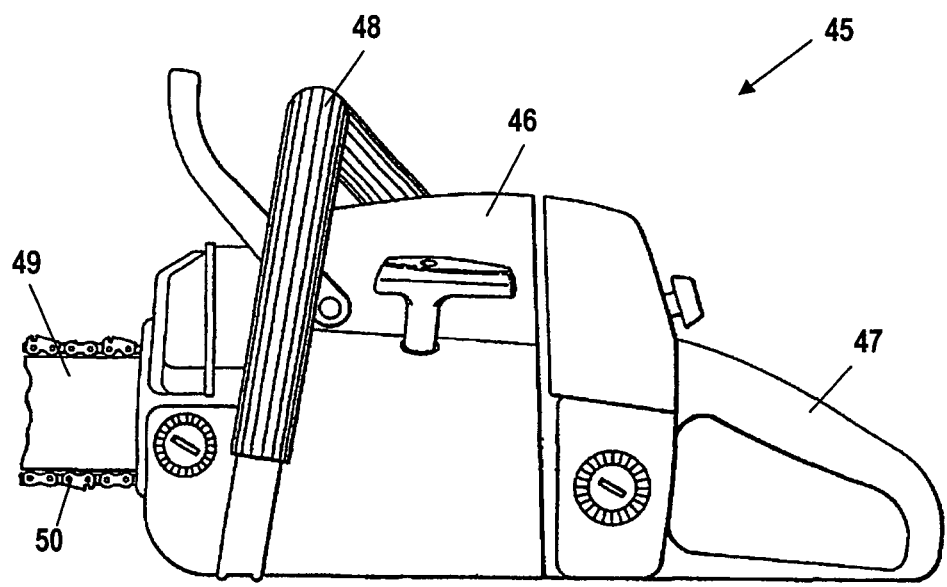
FIG. 8 is a schematic side elevation view of a chain saw.

A motor-driven chain saw 45 is shown schematically in FIG. 8 as an example for a handheld work apparatus.

The motor-driven chain saw 45 has a housing 46 wherein a drive motor is mounted. A rear handle 47 as well as a grab tube 48 for guiding the motor-driven chain saw 45 are fixed on the housing 46. A guide bar 49 projects forwardly on the end of the housing 46 facing away from the rearward handle 47. A saw chain 50 is arranged on the guide bar 49 and this saw chain is driven so as to move about the guide bar by the drive motor of the motor-driven chain saw 45.

Figure 9:
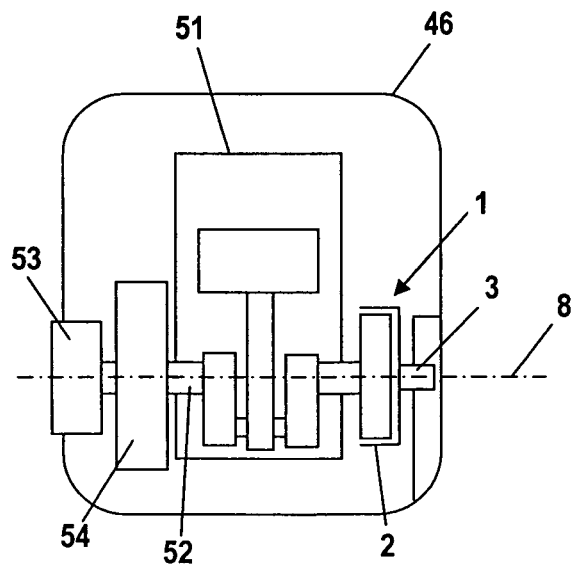
FIG. 9 is a schematic section view taken through the motor-driven chain saw of FIG. 8.

As shown in FIG. 9, the drive motor 51 is configured as a single-cylinder internal combustion engine. The drive motor 51 is especially a two-stroke engine which advantageously operates with a scavenging supply. The drive motor 51 rotatingly drives a crankshaft 52 about a rotational axis 8. The rotational axis 8 is the rotational axis of the crankshaft 52 which is coincident with the rotational axis of the centrifugal clutch 1. The crankshaft 52 is connected via the centrifugal clutch 1 to a drive sprocket 3 which drives the saw chain 50. In addition, the centrifugal clutch 1 has a clutch drum 2 which is fixedly connected to the drive sprocket 3 so as to rotate therewith. A fan wheel 54 is fixed on the crankshaft 52 on the end of the drive motor 51 lying opposite the centrifugal clutch 1. A starter device 53 which functions to start the drive motor 51 can be coupled to the fan wheel 54 on the side of the fan wheel facing away from the drive motor 51.

Figure 2:
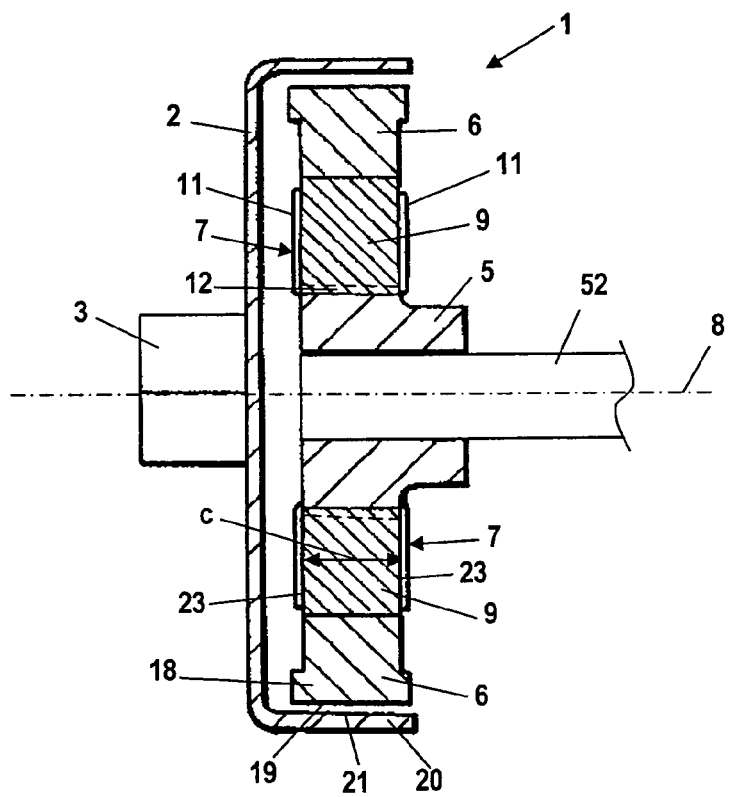
FIG. 2 is a section view through the centrifugal clutch of FIG. 1 taken along lines II-II of FIG. 1.

The centrifugal clutch 1 shown in FIGS. 1 and 2 has a carrier 5 which is connected to the crankshaft 52 so as to rotate therewith. In the embodiment, the carrier 5 has three arms 9 which are arranged so as to be uniformly distributed over the periphery of the carrier 5. The arms 9 are directed radially outwardly referred to the rotational axis 8. A centrifugal weight 6 is held on each arm 9. For this purpose, each centrifugal weight 6 has a receptacle 4 into which an arm 9 projects. The centrifugal weights 6 are held on the arms 9 so as to be radially movable. The centrifugal weights 6 are connected to each other via tension springs 10 which pull the centrifugal weights 6 into the rest position shown in FIGS. 1 and 2. When rotating the carrier 5 about the rotational axis 6, the centrifugal weights 6 are pressed radially outwardly because of the centrifugal force against the force of the tension springs 10. The centrifugal weights 6 each have a flange 18 whose outer surface is pressed during clutch operation against the inner surface 21 of the peripheral wall 20 of the clutch drum 2. For each centrifugal weight 6, the flange 18 lies at the radial outer-lying peripheral edge. Because the outer surface 19 is pressed against the inner surface 21, the crankshaft 52 is connected to the clutch drum 2 so that the crankshaft 52 and clutch drum 2 rotate together. The peripheral wall 20 of the clutch drum surrounds the centrifugal weights 6 and the arms 9 of the carrier 5.

A holder 7 is assigned to each centrifugal weight 6 to secure the position of the centrifugal weights 6 in the direction of the rotational axis 8. As shown in FIG. 2, the holders 7 are configured to have a U-shape and have two legs 11 which lie against opposite-lying end faces 23 of the arms 9 and of the centrifugal weights 6. In this way, the holders 7 secure the position of the centrifugal weights 6 on the arms 9 of the carrier 5 in both directions of the rotational axis 8 toward the drive sprocket 3 as well as to the end facing toward the drive motor 51 (FIG. 9). All three holders 7 are configured to be identical.

The arm 9 of the carrier 5 lies between two arms 29 of the centrifugal weight 6 and is guided between these arms in the peripheral direction to the rotational axis 8. The two arms 29 project radially inwardly.

An enlarged view of a holder 7 is shown in FIGS. 3 to 5. As shown in FIG. 4, the holder 7 is configured to have a U-shape and the two legs 11 define the legs of the U. The two legs 11 are connected to each other via a guide region 12. The guide region 12 is the planar region at the base of the U and is connected via bend regions 13 to respective legs 11. As shown in FIG. 2, the guide region 12 is arranged radially inwardly and the legs 11 of the holders 7 project radially outwardly referred to the rotational axis 8 of the centrifugal clutch 1.

As shown in FIG. 5, the holder 7 has an opening 15 in the guide region 12 through which an arm 9 projects. The arm 9 is shown in FIG. 5 in phantom outline. The holder 7 lies against the arm 9 with guide surfaces 14. The width (d) of the guide surfaces 14 (FIG. 4) is less than the width (c) of the arm 9. The guide surfaces 14 extend only in the planar region of the holder 7. As shown in FIG. 1, the guide surfaces 14 extend parallel to the rotational axis 8 of the centrifugal clutch 1. The guide surfaces 14 are parallelly offset relative to the radial direction so that the guide surfaces 14 lie parallel to the longitudinal sides of the particular arm 9.

Cutouts 16 are arranged next to the guide surfaces 14 and are set back from the arm 9 relative to the guide surfaces 14. A distance (a), which is measured perpendicularly to the guide surfaces 14, is formed between the arm 9 and the base 24 of the cutout 16. The cutouts 16 extend over the entire bend region 13 of the holder 7. In this way, it is ensured that the holder 7 cannot come into contact with the arm 9 in the bend region 13. A step 22 is formed between the guide surface 14 and the cutout 16 and this step delimits the guide surface 14.

FIG. 6 shows the holder 7 before the bending operation. The holder 7 is configured as a sheet-metal bending part which is first cut out or stamped from a planar piece of sheet metal and thereafter is bent into the U-shape. As shown in FIG. 6, the holder 7 is formed from an almost rectangular plate having corners provided with bevels 17. The holder 7 has an opening 15 disposed in the center thereof. In this way, the two legs 11 are connected to each other in the guide region 12 and also in the bend region 13 via two struts 25. Each strut 25 has a guide surface 14. The opening 15 likewise has an essentially rectangular shape with rounded corners and with the cutouts 16 in the long sides of the rectangle with these sides delimiting the struts 25. A bend line 26 runs on each strut 25 at both sides of the guide surfaces 14. This bending line 26 indicates in which region the leg 11 will be bent over relative to the guide region 12. The bend region 13 is arranged in the area of the bending lines 26 for the completed bent holders 7.

An embodiment of a holder 27 is shown in FIG. 7. The holder 27 has two legs 31 which lie against the two arms 29 of the centrifugal weight 6. The two legs 31 are connected to each other via a strut 35. The strut 35 runs midway between the two arms 29 and two guide surfaces 34 are formed on the strut 35 at the opposite-lying longitudinal sides. The guide surfaces 34 have a width (d) which is less than the width (c) of the arms 29 of the carrier 5. The guide surfaces 34 are delimited by steps 42. Cutouts 36 border on the steps 42 in the bend region of the holder 27. In this way, it is ensured that the guide surfaces 34 extend only in the planar region of the holder 27. The strut 35 extends between the two arms 29 of the centrifugal weight. In the embodiment of a holder 27 shown in FIG. 7, the legs 31 extend radially inwardly toward the rotational axis 8 of the centrifugal clutch 1. The base 44 of the cutout 36 is at a distance (b) to the guide surface 34.

The legs (11, 31) of the holders (7, 27) are configured as clamping legs and lie tightly against the arms 29 of the centrifugal weights 6, especially with a pretensioning, as well as against the arms 9 of the carrier 5. This provides an excellent axial holding in both directions of the rotational axis 8 of the centrifugal clutch 1. However, it can also be provided that a holder is configured to have a Z-shape so that one leg (11, 31) can project radially inwardly and the other leg (11, 31) can project radially outwardly. In this embodiment, an axial holding is provided only in one direction of the rotational axis 8. The load of the holder (7, 27) in the bend region 13 is increased because of the pretensioning of the legs (11, 31). The cutouts (16, 36) simultaneously reduce the mechanical load in this region so that an overload is avoided.

It is understood that the foregoing description is that of the preferred embodiments of the invention and that various changes and modifications may be made thereto without departing from the spirit and scope of the invention as defined in the appended claims.

What is claimed is:

1. A centrifugal clutch comprising:
a carrier defining an axis of rotation;
clutch drum disposed in surrounding relationship to said carrier;
at least one centrifugal weight disposed within said clutch drum;
said centrifugal weight being mounted on said carrier so as to be displaceable in a radial direction relative to said axis;
at least one holder configured to hold said centrifugal weight on said carrier in at least one axial direction of said axis during a movement of said holder and said centrifugal weight in radial direction;
said holder having at least one guide surface with which said holder and said centrifugal weight are guided on said carrier during said movement of said holder with said centrifugal weight in said radial direction relative to said axis;
said guide surface extending parallel to said axis and extending parallel to said radial direction relative to said axis and being in contact engagement with said carrier during said movement in said radial direction;
said holder having a bend region, a planar region and said guide surface being formed in said planar region;
said carrier having an arm having a width (c) in the direction of said axis and said holder being mounted on said arm; and, said guide surface has a width (d) in said direction of said axis which is less than said width (c) of said arm in said direction of said axis; and,
said bend region being recessed and in spaced relationship to said carrier so as not to come in contact therewith during said movement.

2. The centrifugal clutch of claim 1, wherein said holder has at least one leg lying transversely to said axis for holding said centrifugal weight with respect to said carrier in the axial direction of said axis.

3. The centrifugal clutch of claim 2, wherein said one leg is a first led of said holder for holding said centrifugal weight with respect to a first side of said carrier; and, said holder has a second leg disposed against a second side of said carrier lying opposite said first side thereof.

4. The centrifugal clutch of claim 3, wherein said first and second legs are configured as spring clamping legs.

5. The centrifugal clutch of claim 4, wherein said holder has a guide region lying parallel to said axis; and, said guide surface is formed in said guide region.

6. The centrifugal clutch of claim 5, wherein said holder is configured to have a U-shaped configuration defining a base forming said guide region.

7. The centrifugal clutch, of claim 6, wherein said guide region and one of said legs conjointly define a bend region and said guide region ends ahead of said bend region.

8. The centrifugal clutch of claim 7, wherein said holder has a cutout in said bend region and said cutout has a base at a distance (a) from said guide surface with said distance (a) being measured perpendicularly to the plane of said guide surface.

9. The centrifugal clutch of claim 5, wherein said guide surface is a first guide surface and said guide region has first and second struts; said first strut defines said first guide surface; said second strut defines a second guide surface; and, said first and second struts delimit an opening through which said arm projects.

10. The centrifugal clutch of claim 5, wherein said guide surface is a first guide surface; said centrifugal weight has first and second arms conjointly defining a space for said arm of said carrier; said guide region of said holder includes a strut lying between said arms of said centrifugal weight; said strut has mutually opposite lying sides; and, one of said sides defines said first guide surface and the other one of said sides defines a second guide surface.

11. The centrifugal clutch of claim 1, wherein said holder is a bent sheet metal part.

12. The centrifugal clutch of claim 1, wherein said centrifugal clutch comprises a plurality of said centrifugal weights and a plurality of said holders associated with corresponding ones of said centrifugal weights; and, all of said holders are identically configured.

13. The centrifugal clutch of claim 1, wherein said holder has a step next to said guide surface delimiting said guide surface.

14. A centrifugal clutch comprising:
a carrier defining an axis of rotation;
a clutch drum disposed in surrounding relationship to said carrier;
at least one centrifugal weight disposed within said clutch drum;

said centrifugal weight being mounted on said carrier so as to be displaceable in a radial direction relative to said axis;

at least one holder mounted on said centrifugal weight for holding said centrifugal weight on said carrier in at least one axial direction of said axis during a movement in said radial direction;

said holder having at least one guide surface with which said holder and said centrifugal weight are guided on said carrier during said movement of said holder with said centrifugal weight in said radial direction relative to said axis;

said guide surface extending parallel to said axis;

said holder having a bend region whereat said holder is configured to be bent;

said holder having a planar region and said guide surface being formed in said planar region; and, said holder having a cutout in said bend region and said cutout having a base at a distance (a) from said guide surface with said distance (a) being measured perpendicularly to the plane of said guide surface so as to prevent said bend region from coming into contact with said carrier during said movement in said radial direction.

15. A centrifugal clutch comprising:

a carrier defining an axis of rotation;

a clutch drum disposed in surrounding relationship to said carrier;

at least one centrifugal weight disposed within said clutch drum;

said centrifugal weight being mounted on said carrier so as to be displaceable in a radial direction relative to said axis;

at least one holder configured to hold said centrifugal weight on said carrier in at least one axial direction of said axis during a movement of said holder and said centrifugal weight in said radial direction;

said holder having at least one guide surface with which said bolder and said centrifugal weight are guided on said carrier during said movement of said holder with said centrifugal weight in said radial direction relative to said axis;

said guide surface extending parallel to said axis and extending parallel to said radial direction relative to said axis and being in contact engagement with said carrier during said movement in said radial direction;

said holder having a bend region, a planar region and said guide surface being formed in said planar region;

said carrier having an arm having a width (c) in the direction of said axis and said holder being mounted on said arm; and, said guide surface has a width (d) in said direction of said axis which is less than said width (c) of said arm in said direction of said axis;

said guide surface and said arm of said carrier conjointly defining a contact interface as said holder and said centrifugal weight are guided on said arm of said carrier; and, said bend region having a cutout formed therein and said cutout having a base spaced away from said contact interface so as to prevent said bend region from coming into contact with said arm of said carrier during said movement of said holder and said centrifugal weight in said radial direction whereby a mechanical weakening of said holder in said bend region because of wear is prevented.

* * * * *

UNITED STATES PATENT AND TRADEMARK OFFICE
CERTIFICATE OF CORRECTION

PATENT NO. : 8,434,608 B2  
APPLICATION NO. : 12/068769  
DATED : May 7, 2013  
INVENTOR(S) : Uhl

Page 1 of 1

It is certified that error appears in the above-identified patent and that said Letters Patent is hereby corrected as shown below:

In the Claims

In Column 6:

Line 29: delete "clutch," and insert -- clutch -- therefor.

In Column 8:

Line 6: delete "bolder" and insert -- holder -- therefor.

Signed and Sealed this  
Eighteenth Day of June, 2013

Teresa Stanek Rea  
*Acting Director of the United States Patent and Trademark Office*